United States Patent [19]
Rauschenbach et al.

[11] 3,754,180
[45] Aug. 21, 1973

[54] CIRCUIT FOR CONVERTING AN INPUT VOLTAGE OF VARIABLE FREQUENCY INTO AN OUTPUT VOLTAGE OF A PREDETERMINED, LOWER FREQUENCY

[75] Inventors: Franz Rauschenbach; Wolfgang Timpe, both of Erlangen; Hermann Waldmann, Weiher, all of Germany

[73] Assignee: Siemens Aktiengesellschaft, Munich, Germany

[22] Filed: June 23, 1972

[21] Appl. No.: 265,688

[30] Foreign Application Priority Data
June 25, 1971 Germany.................. P 21 31 757.7

[52] U.S. Cl..................................... 321/61, 321/66
[51] Int. Cl. ............................................. H02m 5/22
[58] Field of Search...................... 318/227; 321/60, 321/61, 65, 66, 69 R

[56] References Cited
UNITED STATES PATENTS
3,609,509  9/1971  Lafuze ............................. 321/61 X Primary Examiner—A. D. Pellinen
Attorney—Hugh A. Chapin

[57] ABSTRACT

A circuit for converting an input voltage of variable frequency into an output voltage having a predetermined, lower frequency by means of a controlled static frequency converter which is operated as a direct link inverter. The output voltage of the frequency converter is multiplied in a first multiplier circuit by a sine voltage and in a parallel connected second multiplier circuit by a cosine voltage. The respective a-c components in each parallel circuit are filtered out in succeeding smoothing members. The remaining d-c voltage components are then each added in a summing point to preset reference values. The sum voltages are each fed to a voltage regulator, which is followed by a third and fourth multiplier, respectively. In the third and fourth multiplier the output of the voltage regulator is multiplied by the identical sine and cosine voltages. The last-mentioned multipliers are then connected to a common summing point which feeds a control voltage to the control unit of the frequency converter.

13 Claims, 1 Drawing Figure

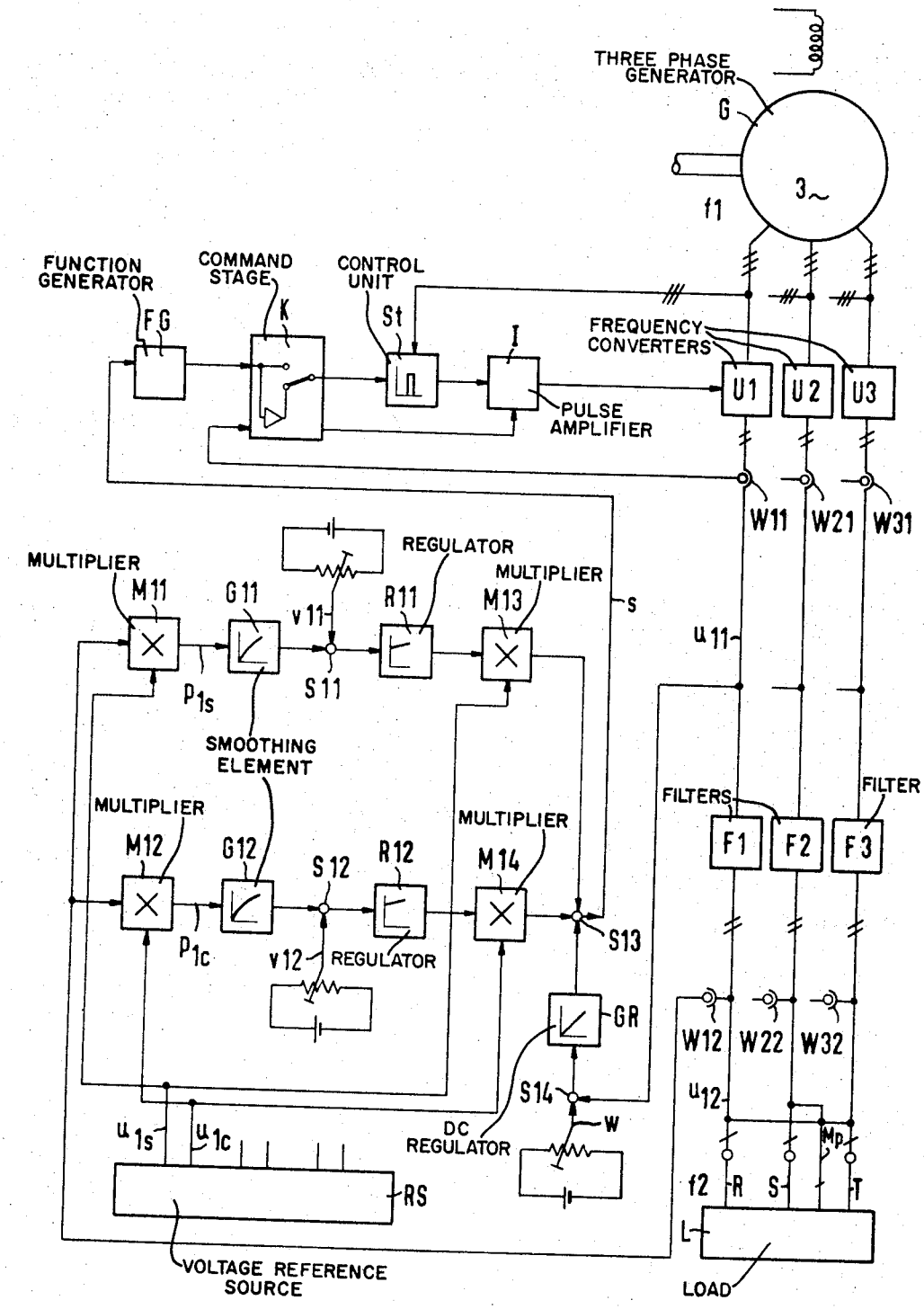

CIRCUIT FOR CONVERTING AN INPUT VOLTAGE OF VARIABLE FREQUENCY INTO AN OUTPUT VOLTAGE OF A PREDETERMINED, LOWER FREQUENCY

BACKGROUND OF THE INVENTION

1. Field of the Invention

The invention is concerned with a circuit for converting an input voltage of variable frequency into an output voltage of a predetermined, lower frequency. More particularly, it is concerned with a static frequency converter fed by the input voltage, and having a command stage and a control unit synchronized to the variable frequency.

2. Description of the Prior Art

In general, the invention converts an input voltage of variable frequency into an output voltage of a predetermined, lower frequency by means of a static frequency converter. The frequency of the input voltage, which may be supplied, for example, by a three-phase generator of 30 kVA, may be between 800 and 1,600 Hz because the driving speed varies, and the desired frequency of the output voltage may, for example, be 400 Hz.

If a rotating field device is fed by static frequency converters, a sinusoidal wave shape in either the load current or the load voltage can be achieved if the reference value set in the control loop has a sinusoidal shape. Because this reference value continuously varies and the response time of the controls in the control loop is appreciable, a permanent control deviation results. If either the output frequency of the static frequency converter is relatively low, say, 50 or 60 Hz, or if this permanent control deviation is tolerated, the static frequency converter can be operated in a control loop of conventional design. However, difficulties are encountered if the output frequency is higher, for example, if it is to be 400 Hz. Furthermore, there are applications where such a control deviation is not permissible, for example, in the parallel operation of static frequency converters.

It has previously been known to change frequencies by using three static, frequency converters with controlled values in a three-phase bridge circuit, the outputs of which are connected together in such a manner that they form a three-phase output system feeding a three-phase load.

For suppressing harmonics, a filter is arranged in the output of each static frequency converter. The static frequency converters are fed by a generator which supplies three physically separated voltages of the same frequency between 800 and 1,600 Hz. For each static frequency converter, a control unit synchronized to this frequency is provided. Each control unit is preceded by a command stage and followed by a double pulse amplifier. This command stage alternatively activates the two individual pulse amplifiers, each of which is assigned to one of the converter branches of the static frequency converter, as a function of the alternating polarity of the load current.

If now an unbalanced load is present at the three-phase output system, it is necessary to control the three output voltages for constant amplitude and phase, so that the voltage symmetry is not impaired. If conventional control circuits are used because of the problems previously mentioned, the frequency of the output voltages must not exceed a maximum value determined by the control elements.

It is an object of the invention to provide a control and regulating circuit for the circuit described above which control circuit also assures correct operation at higher output frequencies. The control and regulating circuit should also be usable with each of three static frequency converters fed by a generator whose terminal voltage has a frequency between 800 and 1,600 Hz because of the variable speed at which it is driven, and which forms a three-phase output system of constant frequency, for example, 400 Hz. In this case, the three-phase output system must have constant angular speed with low harmonics. The particular problem is therefore to maintain within wide limits the symmetry of the magnitude and phase of the three-phase voltage of this three-phase output system.

SUMMARY OF THE INVENTION

The invention is based on the recognition that the output voltage of the static frequency converter can be regulated by a control and regulating arrangement which converts the output voltage into d-c voltages, by aid of two reference voltages mutually phase shifted by 90°.

The invention uses a circuit arrangement of the type mentioned above. It comprises a feature that the output voltage, as the actual a-c voltage, is multiplied in a first multiplier by a sine voltage of the predetermined frequency, and in a second multiplier by a cosine voltage of the predetermined frequency. The a-c component of the multipliers' output voltages are filtered out by successive smoothing members with the remaining d-c components in each case compared at a summing point with a pre-set reference value to obtain the desired output voltage. The voltage sum so formed in each case is fed to a successive voltage regulator and the output voltage of each voltage regulator is multiplied in a third and fourth multiplier by the sine or cosine voltage. The outputs of the multipliers are connected to a common summing point, and the voltage sum thus formed is fed as the control voltage to the control unit through the command stage.

According to another feature of the invention, the one summing point receives a fixed reference value different from zero, and the other summing point a reference value equal to zero.

BRIEF DESCRIPTION OF THE DRAWING

The invention, further embodiments and advantages will be explained more fully in the following by reference to the Drawing which illustrates a schematic drawing of an embodiment of the invention.

DESCRIPTION OF THE PREFERRED EMBODIMENT

As shown in the drawing, a three-phase generator G, because it is driven at variable speed, delivers a terminal voltage of frequency $f1$, which may be between 800 and 1,600 Hz. The three-phase generator G has three physically separated three-phase systems. Three static frequency converters U1, U2 and U3, are each connected to one of the three-phase systems. The outputs of the static frequency converters U1, U2 and U3 feed a three-phase load L with a desired frequency $f2$, for example, 400 Hz, through filters F1, F2 and F3, which are provided to suppress harmonics and the outputs of which are Y-connected at the output terminals R, S and T. This frequency $f2$ is thus lower than the frequency $f1$. The static frequency converters U1, U2 and U3 are designed, for example, with three-phase bridge circuits. Static frequency converters and their operation are old and are shown, for example, in Siemens Zeitschrift vol. 45 (1971), No. 4, p. 189 to 191, and No. 5, p. 362 to 367.

The static frequency converters U1, U2 and U3 are supplied with frequency f1 between 800 and 1,600 Hz and are operated as direct-link converters. Current transformers W11, W21 and W31 are connected to the output of each of the static frequency converters U1, U2 and U3. The outputs of the filters F1, F2 and F3 are furthermore each followed by a voltage transformer W12, W22 and W32.

As shown in the drawing, the number of connecting wires is indicated by the number of sloping lines on each connector. In order to keep the drawing simple, only the control and regulating circuit for the static frequency converter U1 is shown in the FIGURE. The control and regulating circuits for the static frequency converters U2 and U3 are constructed in a similar manner.

A common three-phase voltage reference source RS is provided for all static frequency converters U1, U2 and U3. It delivers sinusoidal voltages of the desired frequency $f2$, i.e., 400 Hz. It is designed as a sine-cosine generator and supplies all the control and regulating arrangements with a sine and cosine voltage of fixed amplitude and constant frequency $f2$. The control and regulating arrangement for the static frequency converter U1, which is shown in the FIGURE, is supplied with the sine voltage $u_{1s}$ and with the cosine voltage $u_{1c}$ of the predetermined frequency $f2$. The sine and cosine voltages for the other two control and regulating arrangements are each displaced by 120° and are not specifically shown in the FIGURE.

With the static frequency converter U1 is associated a control unit St synchronized to the frequency f1. This is preceded by a command stage K and followed by a pulse amplifier stage I. Such an arrangement of a command stage K, control unit St and pulse amplifier I is old and illustrated, for example, by static frequency converter circuits without circulating currents such as in Siemens Zeitschrift vol. 45 (1971) No. 4, p. 183 to 185. This arrangement permits the proper triggering of the control valves of the static frequency converter U1 as a function of a control voltage.

The control and regulating arrangement shown eliminates maintaining the filtered, sinusoidal output voltage $u_{12}$ at a desired value $u^*_{12}$ with respect to its phase, amplitude and frequency $f2$. For this purpose the output voltage $u_{12}$ taken off the voltage transformer W12 is fed to two multipliers M11 and M12 as the actual a-c voltage value. In the first multiplier M11 it is multiplied by the sine voltage $u_{1s}$, and in the second multiplier M12 by the cosine voltage $u_{1c}$. The product, output voltage $p_{1s}$, appears at the output of the first multiplier M11, and the output voltage $p_{1c}$ at the output of the second multiplier M12. Both output voltages $p_{1s}$ and $p_{1c}$, in addition to an a-c component of twice the frequency of $f2$, contain a d-c component, which depends on the amplitude and phase error of the output voltage $u_{12}$.

The output voltages $p_{1s}$ and $p_{1c}$ are fed to the summing points S11 and S12, respectively, through smoothing elements G11 and G12. The smoothing elements G11 and G12 suppress the a-c components of the output voltages $p_{1s}$ and $p_{1c}$. If the output voltage $u_{12}$ is constant as to amplitude and phase, the average values of the output voltages supplied by the smoothing elements G11 and G12 must also be constant.

At the two summing points S11 and S12, the constant reference values $v_{11}$ and $v_{12}$, are added to the output voltages from G11 and G12. The control deviation is thus formed. The phase and amplitude of the desired output voltage $u^*_{12}$ is set by the two reference voltages $v_{11}$ and $v_{12}$, which are d-c voltages. The reference value $v_{12}$ determines the phase of the output voltage $u_{12}$ and is preferably set at zero. The sum voltages formed are fed to regulators R11 and R12 which are shown in the FIGURE as PI voltage controls. The two output voltages of the regulators R11 and R12 are fed to the inputs of a third and fourth multiplier M13 and M14. To the other input of M13 the sine voltage $U_{1s}$ is fed and the cosine voltage $u_{1c}$ is fed to the other input of M14. At the output of the multiplier M13 an a-c voltage of frequency $f2$ therefore appears in phase with the sine voltage $u_{1s}$. Similarly, an a-c voltage in phase with the cosine voltage $u_{1c}$ appears at the output of the multiplier M14. The amplitudes of the a-c voltages of the multipliers M13 and M14 are determined by the output voltages of the regulators R11 and R12, respectively. Both a-c voltages are added at the common summing point S13. The sum voltage s of frequency f2 thereby formed is used as the control quantity, i.e., as the control voltage for the command stage K and the control unit St. It varies as to magnitude and phase as a function of the amplitude and phase errors of the output voltage $u_{12}$. It should be emphasized that the two regulators R11 and R12 have to process only d-c quantities, and that for this reason it was possible to operate a practical embodiment of the circuit arrangement shown without difficulties at a frequency f2 of 400 Hz, which is high for a static frequency converter.

Control units St are available, in which the output voltage of the connected static frequency converter U1 is proportional to the cosine of the control voltage fed to the control unit St. In this case in order to obtain a direct proportional relationship, the command stage K and therefore, the control unit St is preceded by a function generator FG having an arc cosine characteristic, which is shown, for example, in the German Provisional Pat. No. 1,806,768. The sum voltage s, delivered by the summing member S13, therefore directly determines the control voltage of the control unit St through this function generator FG and the command stage K, which contains an arrangement for reversing the sign.

A d-c component may be contained in the output voltage $u_{11}$ of the static frequency converter U1. For compensating this d-c component a d-c regulator GR is provided, the output of which is connected to the summing point S13. The d-c regulator is fed from a further summing point S14, to which is fed the output voltage $u_{11}$ of the static frequency converter U1 and a reference value w for the d-c component. If the d-c voltage component is not desired, the reference value w is set to equal zero.

If several of the circuit arrangements shown in the FIGURE are to operate in parallel into a common consumer bus, additional control arrangements can be provided for splitting the load. These then influence the reference valves $v_{11}$ and $v_{12}$ at the summing points S11 and S12, respectively.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A circuit for converting an input voltage of variable frequency into an output voltage of a predetermined lower frequency in which the input voltage of variable frequency is fed to a static frequency converter, the output voltage of the static frequency converters being fed to a circuit comprising a first circuit in which the output voltage of the static frequency converter is multiplied by a sinusoidal voltage at the predetermined frequency, the output voltage of which is filtered through a smoothing circuit, the d-c component of the output of which is compared at a summing junction to a predetermined d-c reference value to form another output voltage which is then fed to a voltage regulator circuit, the output of which is multiplied in a second multiplier circuit by the sinusoidal voltage at the predetermined frequency, a second circuit connected in parallel to the first circuit in which the output voltage of the static frequency converter is multiplied by a cosinusoidal voltage of the predetermined frequency, the output voltage of which is filtered through a smoothing circuit, the d-c component of the output of which is compared at a summing junction to a predetermined d-c reference value to form another output voltage which is then fed to a voltage regulator circuit, the output of which is multiplied in a second multiplier circuit by the cosinusoidal voltage at the predetermined frequency, and the outputs of the first and second circuits being connected to a common summing point to form a control voltage which is fed through a command circuit and a control circuit to regulate the static frequency converter to produce an output signal of the predetermined lower frequency.

2. A circuit for converting an input voltage of variable frequency into an output voltage of a predetermined lower frequency as in claim 1 in which the reference value of the voltage fed to the output of the smoothing circuit is equal to zero in the second multiplier circuit and in which the reference value of the voltage fed to the output of the smoothing circuit in the first multiplier circuit is different from zero.

3. A circuit for converting an input voltage of variable frequency into an output voltage of a predetermined lower frequency as in claim 1 in which the reference values of the voltages fed to the summing junctions are variable.

4. A circuit for converting an input voltage of variable frequency into an output voltage of a predetermined lower frequency as in claim 1 further comprising a circuit having as an input, the output voltage of the static frequency converter, to which a d-c reference voltage is added, the sum then being fed through a d-c regulator, added to the output of the first and second circuits and this combined signal then being fed to the input of the command circuit.

5. A circuit for converting an input voltage of variable frequency into an output voltage of a predetermined lower frequency as in claim 4 in which the d-c reference voltage value is equal to zero.

6. A circuit for converting an input voltage of variable frequency into an output voltage of a predetermined lower frequency as in claim 1 in which the static frequency converter is connected to a filter circuit, the output of which is connected to a voltage transformer, whose output is connected to the first and second circuits.

7. A circuit for converting an input voltage of variable frequency into an output voltage of a predetermined lower frequency as in claim 1 in which the input voltage is generated by a three-phase generator.

8. A circuit for converting an input voltage of variable frequency into an output voltage of a predetermined lower frequency as in claim 7 in which the generator comprises a plurality of separate three-phase winding systems.

9. A circuit as claimed in claim 1, further comprising a function generator connected between said summing point and said command circuit.

10. A circuit for converting three three-phase input voltages of variable frequency into three one-phase output voltages of a predetermined lower frequency comprising an electrical generator having three separate three-phase winding systems each of which is connected to a converter system comprising a static frequency converter, a current transformer, a voltage transformer, and an one-phase output for connecting a load thereto, a control circuit arrangement and a regulating circuit for each of the converter systems, the control circuit arrangement comprising a command circuit having a first input from the current transformer, a control circuit having an input from the command circuit and an input from the output of the three-phase winding system of the generator, the output of the control circuit being fed as an input to the static frequency converter, the regulating circuit having an input from the voltage transformer and an output for controlling the command circuit, the regulating system comprising a first multiplier circuit comprised of a first multiplier having an input from the voltage transformer, the multiplier mulitplying this voltage by a sinusoidal voltage signal at the predetermined lower frequency, the output of the multiplier being fed to a smoothing circuit whose output is added to a variable predetermined d-c voltage, the sum of these voltages being fed as an input to a regulator whose output is fed to a second multiplier in which the signal is again multiplied by a sinusoidal voltage signal at the predetermined lower frequency, a second multiplier circuit connected in parallel to the first multiplier circuit comprised of a third multiplier having an input from the voltage transformer, the multiplier mulitplying this voltage by a cosinusoidal voltage signal at the predetermined lower frequency, the output of the multiplier being fed to a smoothing circuit whose output is added to a variable predetermined d-c voltage, the sum of these voltages being fed as in input to a regulator whose output is fed to a fourth multiplier in which the signal is again multiplied by a cosinusoidal voltage signal at the predetermined frequency, the output of the first multiplier circuit being added at a summation point with the output of the second multiplier circuit, the signal obtained from this summation point then being fed as an input to the command circuit, to regulate the static frequency converter and in conjunction with the other circuit elements to produce an one-phase output voltage of the predetermined frequency lower than the frequency output of the generator.

11. A circuit as claimed in claim 10, in which said three one-phase outputs are connected to form a three-phase output for connecting a three-phase load thereto.

12. A circuit for converting an input voltage of variable frequency into an output voltage of a predetermined lower frequency as in claim 10 in which all three regulating circuits have a common reference three-phase sinusoidal voltage source for generating reference output voltage signals at the predetermined frequency.

13. A circuit for converting three three-phase input voltages of variable frequency into a three-phase output voltage of a predetermined lower frequency comprising an electrical generator having three separate three-phase winding systems each of which is connected to a converter system comprising the series connection of a static frequency converter, a current transformer, a filter circuit, and a voltage transformer, the outputs of the converter systems being Y-connected to a three-phase load;

a control circuit arrangement and a regulating circuit for each of the converter systems, the control circuit arrangement comprising a command stage having a first input from the current transformer, a control unit having an input from the command stage and an input from the output of the three-phase generator, a pulse amplifier connected in series to the control unit and whose first input is the output of the control unit and whose second input is an output of the command stage, the output of the pulse amplifier being fed as an input to the static frequency converter, the regulating circuit connected to the voltage transformer and whose output controls the command stage, the regulating circuit comprising a first multiplier circuit comprised of a first multiplier having an input from the voltage transformer, the multiplier multiplying this voltage by a sinusoidal voltage signal at the predetermined lower frequency, the output of the multiplier being fed to a smoothing circuit whose output is added to a variable predetermined d-c voltage, the sum of these voltages being fed as an input to a regulator whose output is fed to a second multiplier in which the signal is again multiplied by a sinusoidal voltage signal at the predetermined lower frequency, a second multiplier circuit connected in parallel to the first multiplier circuit comprised of a thrid multiplier having an input from the voltage transformer, the multiplier multiplying this voltage by a cosinusoidal v0ltage signal at the predetermined lower frequency, the output of the multiplier being fed to a smoothing circuit whose output is added to a variable predetermined d-c voltage, the sum of these voltages being fed as an input to a regulator whose output is fed to a fourth multiplier in which the signal is again multiplied by a cosinusoidal voltage signal at the predetermined frequency, the output of the first multiplier circuit and the second multiplier circuit being added at a summation point with a d-c regulating signal obtained by adding a signal from the converter system obtained at a point between the current transformer and the filter circuit, the signal being added to a variable d-c reference value and passed through a d-c regulator and then added to the combined signal from the first multiplier circuit and the second multiplier circuit, the signal obtained from this summation then being added as an input to a function generator, the output of which is fed as an input to the command stage, to regulate the static frequency converter and in conjunction with the other circuit elements produce a three-phase output voltage at the load of a predetermined frequency lower than the frequency output of the generator.

* * * * *